Oct. 16, 1962   H. R. C. PRATT   3,058,898
NUCLEAR REACTORS
Filed March 5, 1957

3,058,898
NUCLEAR REACTORS
Henry R. C. Pratt, Abingdon, England, assignor to The United Kingdom Atomic Energy Authority of Patents Branch, London, England
Filed Mar. 5, 1957, Ser. No. 643,996
Claims priority, application Great Britain Mar. 5, 1956
3 Claims. (Cl. 204—154.2)

This invention relates to nuclear reactors and in particular to boiling reactors.

It is possible to construct a light or heavy water cooled reactor such that the coolant can be allowed to boil thus generating steam directly for use in power turbines. However it has been found that the fluctation of effective coolant density which occurs because of steam voidage during ebullition causes the power output of the reactor to vary within limits since the coolant functions also as a moderator.

An object of the invention is to provide a boiling reactor in which the steam voidage in the core of the reactor is virtually constant thus ensuring a constant power working level.

According to the invention a nuclear reactor comprises, fuel elements of fissile material of such shape and dimensions as to provide a smooth continuous surface, a further continuous surface closely adjacent to said surface to define a passage capable of supporting a climbing film system when the reactor is in operation, and means for feeding coolant liquid to the lower end of said passage at such a pressure head and feed rate that a climbing film system is set up.

The invention is particularly applicable to a reactor of calandria construction employing a liquid moderator.

A reactor in accordance with the invention of liquid moderated calandria type may comprise a pressure shell, a plurality of coolant tubes arranged substantially vertically within said shell, supporting means for said toolant tubes, fuel elements of fissile material contained within said coolant tubes, said fuel elements being of such shape and dimensions as to define a continuous space between the inner surface of said coolant tubes and said fuel elements and such that a smooth continuous surface is provided for the support of a climbing film of liquid when the reactor is in operation, means for feeding coolant liquid to the lower ends of said coolant tubes at such a pressure head and feed rate that a climbing film system is set up, bulk moderator liquid contained in the space surrounding said coolant tubes, means preventing the ingress of said bulk moderator liquid into said coolant tubes, vapour liquid separating means at the upper ends of said coolant tubes, means for passing separated vapour phase to a power producing mechanism, and means for passing separated liquid phase for recirculation.

A feature of the invention consists in the provision of ceramic fuel elements above the point where the climbing film ceases and only the vapour phase remains in the tube. The ceramic fuel elements can be allowed to run dry and superheat the vapour. It will of course be understood that with this modification vapour-liquid separators will not be required.

The invention will be more readily understood if reference is made to the accompanying drawing which illustrates by way of example one embodiment of the invention.

Figure 1:
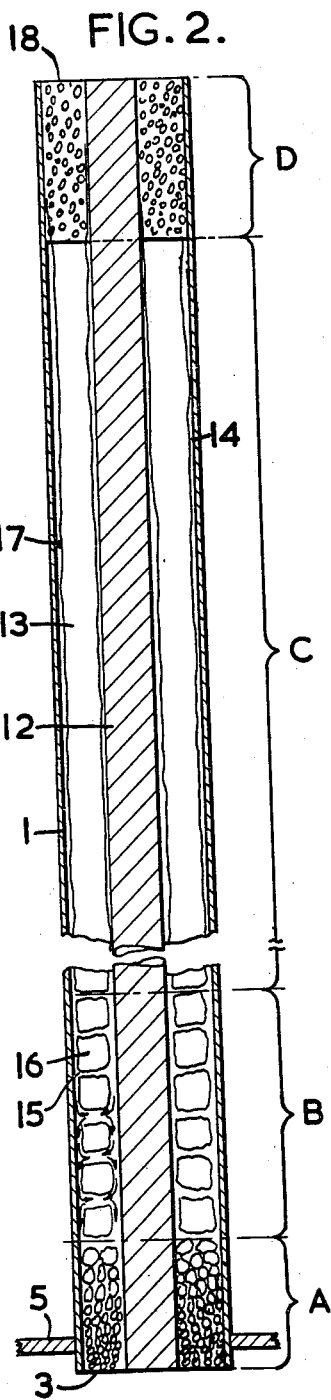
FIG. 1 is a diagrammatic cross sectional elevation.

In FIG. 1 a plurality of circular section coolant tubes 1 are arranged in the form of a calandria. The tubes 1 are arranged vertically inside a pressure shell 2 with the lower ends 3 of the tubes 1 fitting into holes in a plate 5. The plate 5 is arranged horizontally and extends completely across the cross-section of the pressure shell 2 so as to define two compartments 6 and 7 in the shell 2. The compartment 6 contains the fuel coolant tubes 1 and the space surrounding the tubes 1 is filled with the bulk of the moderator liquid 8. The compartment 7 below the ends of the coolant tubes 1 is filled with coolant liquid 9 which is supplied by means of a header tank 10 connecting with the compartment 7 by a feed tube 11. In the case of the described embodiment the coolant liquid is similar to the moderator liquid. The fissile material is contained inside the coolant tubes 1 and may be in the form of a single circular sectioned rod 12 situated coaxially inside each coolant tube 1 so as to define an annular space 13.

Figure 2:
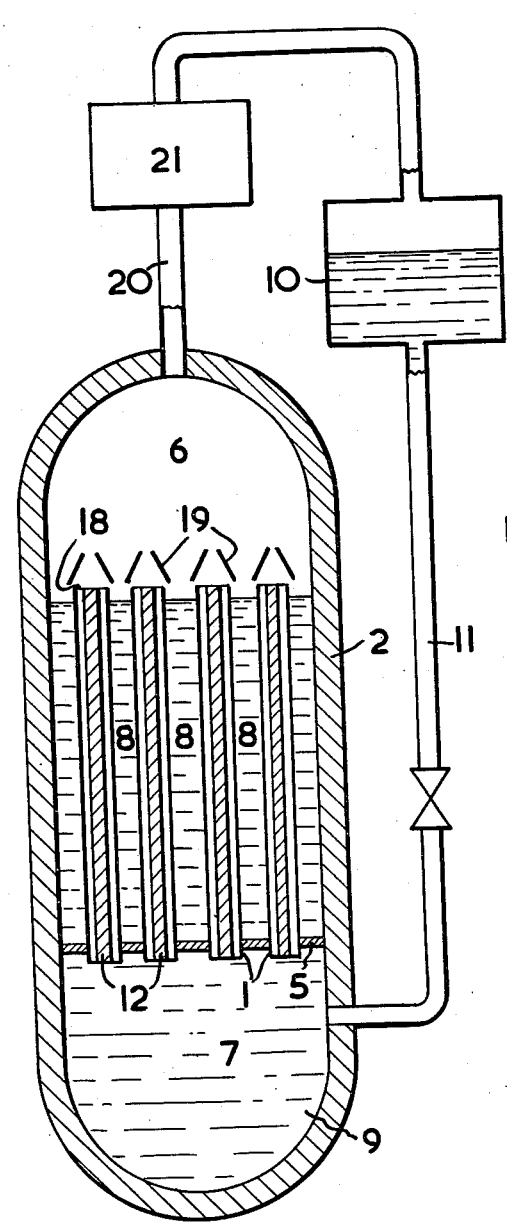
FIG. 2 is a longitudinal cross-section to a larger scale of one of the coolant tubes shown in FIG. 1 showing a climbing film.

Considering now the functioning of an individual tube 1 (reference is directed FIG. 2). The coolant tube 1 contains a rod shaped fuel element 12 arranged concentrically and coaxially with the coolant tube 1 so as to define an annular space 13. Coolant liquid enters the end 3 of the tube 1 from the compartment 7 at a predetermined pressure head and feed rate and a thin film of evaporating coolant liquid climbs upwards over the surface of the heat generating fuel element 12 and the inner surface 14 of the coolant tube 1. This action results from the drag of the high velocity vapour stream in the space 13 between the fuel element 12 and the coolant tube 1. This climbing film is not set up immediately the coolant liquid enters the bottom end 3 of the coolant tube 1. In fact four distinct regions may be distinguished as follows:

(1) *Bubble or froth region.*—At low evaporation ratios i.e. at the bottom end 3 of the tube where the coolant liquid first enters, normal ebullition takes place with the liberation of small discrete bubbles of vapour (region A, FIGURE 2). On passing up the tube the rate of evaporation increases and the bubbles gradually coalesce until the conditions pass into the second or slug flow region.

(2) *Slug flow region.*—In this region (region B, FIGURE 2) discrete annular slugs of liquid 15 alternated by annullar vapour slugs 16 are present in the annular space 13. The liquid slugs 15 climb up the annular space 13 intermittently, becoming progressively smaller due to evaporation and to slippage of liquid down the surface of the fuel element 12 and the inner surface 14 of the coolant tube 1 as indicated by the arrows. Ultimately the liquid slugs 15 vanish and the third region is entered.

(3) *Climbing-film region.*—On disappearance of the liquid slugs 15 the climbing film region is entered (region C, FIGURE 2). In this region a thin liquid climbing film 17 on the fuel element 12 and the inner wall 14 of the coolant tube is drawn up by the drag of the high velocity stream of vapour in the annular space 13. Heat transfer continues to take place from the fuel element 12 to the liquid film 17 on the surface of the fuel element 12 so that this film 17 gradually evaporates and diminishes in thickness.

(4) *Spray (liquid dispersed) region.*—Finally at very high evaporation rates, the film 17 is disrupted with the formation of entrained spray droplets in the vapour stream (region D, FIGURE 2). In general it is necessary to design the reactor so that this region is not entered (e.g. this can be done by careful control of coolant feed rate). If the spray region does occur, drying out of the upper portion of the fuel element may lead to burnout. However this characteristic of complete evaporation in the "spray region" may be turned to advantage by the use of a ceramic type of fuel element, e.g. canned uranium dioxide, which can be allowed to run dry and the steam leaving the coolant tubes will be super-heated.

Referring again to FIGURE 1. In the embodiment illustrated the climbing film region can be made to occupy 60-80% of the total height of the coolant tube 1 and the spray region eliminated by choosing appropriate dimensional parameters and by adjustment of the coolant pressure head and feed rate. Thus the coolant tubes 1 operate primarily in the climbing film region and steam is produced by evaporation of this climbing film. The steam produced and the residual coolant liquid leave the coolant tubes 1 at their ends 18 and in the illustrated embodiment the two phases are separated by means of individual vapour-liquid separators 19 situated on the ends 18 of the tubes 1, said separators 19 being of baffle-plate or cyclone type. In the illustrated embodiment the bulk moderator fluid and the coolant liquid are of the same nature and the separated liquid phase from the coolant tubes 1 may be passed directly into the bulk of the moderator. The steam is drawn from the pressure shell 2 via an outlet tube 20 and is passed to conventional steam power turbines 21 after which it is recondensed and passed back to the coolant header tank 10 and to the bulk moderator space as necessary. The use of individual vapour-liquid separators on the coolant tubes has the advantage that the changing of fuel rods would be comparatively simple. However the coolant tubes 1 can pass into a common header and thence to a single external cyclone separator which method may be the better when a coolant of different nature to the bulk moderator liquid is used and which must not be allowed to enter the bulk moderator. With the embodiment described either heavy or light water can be used as coolant and moderator. Alternatively light water coolant can be used with heavy water moderator, since the coolant film will be very thin and the moderating effect will be small.

One of the main advantages of the invention lies in the minimisation of appreciable changes in moderator density with steaming rate. These variations occur in conventional boiling reactors and give rise to "roughness" in the power output of the reactor. The "roughness" which arises in the described embodiment of the invention due to the fluctuation of effective moderator density in the "froth" and "slug flow" regions is small and the neutron flux is low in the part of the reactor where these regions are situated. In the type of reactor described by way of example the fissile material may be contained in the coolant tubes either as a single rod in each tube (as in the described embodiment) or there could be several rods in each tube or groups of close-pitched plates.

In a reactor similar to the illustrated embodiment generating 440 mw. heat (120 mw. electrical (gross)), 1330 tubes of 1¼ inch inside diameter each about 10 ft. long contain fuel elements of 1 inch outside diameter. Water is fed to the bottom of the tubes at a rate of $1.97 \times 10^6$ lbs./hr. at a temperature of 520° F.

After passing through the tubes, the separators pass $1.18 \times 10^6$ lbs./hr. of steam and $0.79 \times 10^6$ lbs./hr. of water, both at 1600 p.s.i.g. and 606° F. The steam is subsequently superheated to 1000° F. at 1500 p.s.i.g. and passed to the turbine to expend its power. It is condensed at 79° F., and the condensate is heated in 6 stages to 420° F. by steam bled from the turbine. It is then further heated to 456° F. in a heat exchanger which cools the bulk moderator liquid between the coolant tubes, and is finally mixed with the liquid from the separators and returned to the feed at 520° F.

I claim:

1. A method of operating a nuclear reactor having a plurality of fuel elements each disposed longitudinally in a coolant tube, the coolant tubes being mounted in a compartmented pressure vessel and separated from one another by bulk moderator fluid, and the interior surface of each tube and the exterior surface of the fuel element therein being smooth and continuous and defining a narrow annular passage communicating at one end portion of the tube with a compartment containing liquid coolant, comprising feeding the liquid coolant to the passage at said end portion of each tube at a pressure head and flow rate adapted to form in the coolant a body of vaporous coolant acting to force liquid coolant in a thinned-out manner against said surfaces as a climbing film, controlling said pressure head and flow rate so as to extend the climbing film over a major portion of the passage in each tube, and passing the body of vaporous coolant beyond the point where the climbing film ceases over a ceramic fuel element to achieve complete vaporization and superheating.

2. A method according to claim 1 wherein the body of vaporous coolant and the liquid coolant are separated at the other end portion of the tube and the vaporous coolant is conveyed to power producing means.

3. A method according to claim 2 wherein the bulk moderator fluid and the liquid coolant are similar and the liquid coolant emanating at said other end portion is permitted to intermingle with the moderator fluid separating the tubes.

References Cited in the file of this patent

UNITED STATES PATENTS

| 1,067,010 | Dunn | July 8, 1913 |
| 1,847,589 | Brobeck | Mar. 1, 1932 |
| 2,117,337 | Lobel et al. | May 17, 1938 |
| 2,676,651 | Lavigne | Apr. 27, 1954 |

FOREIGN PATENTS

| 753,130 | Great Britain | July 18, 1956 |

OTHER REFERENCES

Untermyer: "Nucleonics," vol. 12, #7, pp. 43–47, July 1954.